United States Patent
Kim et al.

(10) Patent No.: US 11,941,271 B2
(45) Date of Patent: Mar. 26, 2024

(54) STORAGE DEVICES PERFORMING SECURE ERASE AND OPERATING METHODS THEREOF

(71) Applicant: Samsung Electronics Co., Ltd., Suwon-si (KR)

(72) Inventors: Youhwan Kim, Ansan-si (KR); Jihwa Lee, Namyangju-si (KR); Kyungduk Lee, Seongnam-si (KR); Hosung Ahn, Gwangmyeong-si (KR)

(73) Assignee: Samsung Electronics Co., Ltd. (KR)

( * ) Notice: Subject to any disclaimer, the term of this patent is extended or adjusted under 35 U.S.C. 154(b) by 144 days.

(21) Appl. No.: 17/583,713

(22) Filed: Jan. 25, 2022

(65) Prior Publication Data

US 2022/0413701 A1    Dec. 29, 2022

(30) Foreign Application Priority Data

Jun. 25, 2021    (KR) .................... 10-2021-0083186

(51) Int. Cl.
*G06F 3/06* (2006.01)

(52) U.S. Cl.
CPC ............ *G06F 3/064* (2013.01); *G06F 3/0608* (2013.01); *G06F 3/0679* (2013.01)

(58) Field of Classification Search
CPC ...... G06F 3/064; G06F 3/0608; G06F 3/0679; G06F 3/0616; G06F 3/0652; G06F 3/0653; G06F 3/0658; G11C 16/14; G11C 16/08; G11C 16/26; G11C 16/3445
See application file for complete search history.

(56) References Cited

U.S. PATENT DOCUMENTS

| | | | |
|---|---|---|---|
| 8,885,419 B2 * | 11/2014 | Park | G11C 16/14 365/185.12 |
| 9,189,639 B2 | 11/2015 | Tokumoto | |
| 9,293,194 B2 | 3/2016 | Gurgi et al. | |
| 9,317,363 B2 | 4/2016 | Baldwin et al. | |
| 9,633,738 B1 * | 4/2017 | Guo | G11C 16/30 |
| 10,008,272 B2 | 6/2018 | Kang et al. | |
| 10,621,087 B2 | 4/2020 | Seo et al. | |
| 10,818,367 B2 | 10/2020 | Yun et al. | |
| 2007/0101049 A1 | 5/2007 | Salessi et al. | |

* cited by examiner

*Primary Examiner* — Francisco A Grullon

(74) *Attorney, Agent, or Firm* — Myers Bigel, P.A.

(57) ABSTRACT

A storage device performing a secure erase and an operating method thereof are provided. The storage device may include a controller configured to control a non-volatile memory device including a plurality of blocks. The controller includes a secure erase control logic configured to control a secure erase operation on the plurality of blocks and perform a control operation in response to a secure erase request from a host with respect to a first block among the plurality of blocks such that the secure erase operation on the first block is skipped based on a result of determining at least one selected from a secure erase state and/or a deterioration state of the first block.

18 Claims, 17 Drawing Sheets

| NUMBER OF SECURE ERASE OPERATIONS | 0 | 1 | 2 | 3 | 4 |
|---|---|---|---|---|---|
| READ LEVEL | 0.10V | -0.30V | -0.50V | -0.70V | -0.80V |
| OFF-CELL COUNT | OFF-CELL DIFFERENCE ≥ 100 | | | | |

FIG. 14A

| | 0 | 1 | 2 | 3 | 4 |
|---|---|---|---|---|---|
| | | \multicolumn{5}{c}{SECURE ERASE COUNT VALUE} |
| Vers Offset | 0mV | -100mV | -100mV | -200mV | -200mV |
| Erase Time Offset | 0us | -10us | -20us | -20us | -30us |
| Vpgm Offset | 0mV | 50mV | 50mV | 100mV | 100mV |
| Program Time Offset | 0us | 0us | 5us | 5us | 10us |

STORAGE DEVICES PERFORMING SECURE ERASE AND OPERATING METHODS THEREOF

CROSS-REFERENCE TO RELATED APPLICATION

This application is based on and claims priority under 35 U.S.C. § 119 to Korean Patent Application No. 10-2021-0083186, filed on Jun. 25, 2021, in the Korean Intellectual Property Office, and the entire contents of the above-identified application are incorporated by reference herein.

TECHNICAL FIELD

The inventive concept relates to a storage device, and more particularly, to a storage device performing a secure erase and an operating method thereof.

BACKGROUND

Non-volatile memory is a type of memory that may retain data stored therein even when power thereto is cut off. One example of non-volatile memory is flash memory. Storage devices, such as solid state drives (SSDs) and memory cards, including flash memory are widely used. Storage devices are useful for storing or moving a large amount of data.

As storage devices are widely used in various fields, the security of data stored in storage devices is increasingly important. In particular, in computing systems that use storage devices, even if a user requests to delete data, information corresponding to the data may physically remain in the storage device. In general, in the case where data is physically erased to safely delete the data, as the frequency of physical erase operations on one block increases, memory cells may deteriorate, and data reliability may be decreased because of the shift of a threshold voltage distribution.

SUMMARY

Aspects of the present disclosure and the inventive concepts thereof provide a storage device for variously controlling a secure erase operation on a block based on a result of determining various characteristics of the block, which is requested to be securely erased, when providing a secure erase function for data, and an operating method thereof, thereby preventing the deterioration of memory cells and the decrease in data reliability.

According to some aspects of the inventive concepts, a storage device may include a controller configured to control a non-volatile memory device including a plurality of blocks, wherein the controller includes a secure erase control logic configured to control a secure erase operation on the plurality of blocks and perform a control operation in response to a secure erase request from a host with respect to a first block among the plurality of blocks such that the secure erase operation on the first block is skipped based on a result of determining at least one selected from a secure erase state and/or a deterioration state of the first block.

According to some aspects of the inventive concepts, an operating method of a storage device including a controller and a non-volatile memory device including a plurality of blocks is provided. The operating method may include receiving a secure erase request from a host with respect to a first block among the plurality of blocks; determining a secure erase state of the first block based on a threshold voltage distribution of memory cells connected to at least one word line of the first block; and selectively performing a secure erase operation on the first block under a normal operating condition in response to the secure erase request, wherein the performing of the secure erase operation is based on a determination result indicating that no secure erase operation has been performed on the first block, wherein the secure erase operation on the first block is skipped in response to the secure erase request when the first block is in the secure erase state.

According to some aspects of the inventive concepts, an operating method of a storage device including a controller and a non-volatile memory device including a plurality of blocks is provided. The operating method may include receiving a secure erase request from a host; counting a number of secure erase operations performed on each of the plurality of blocks when a secure erase operation is performed on at least one of the plurality of blocks in response to the secure erase request; receiving a secure erase request with from the host with respect to a first block among the plurality of blocks; and selectively performing the secure erase operation on the first block or skipping the secure erase operation on the first block, wherein the performing or the skipping is selected according to a count value corresponding to the first block.

BRIEF DESCRIPTION OF THE DRAWINGS

Some example embodiments of the inventive concepts may be more clearly understood from the following detailed description taken in conjunction with the accompanying drawings in which:

FIGS. 14A and 14B are diagrams showing an example of operating conditions of an adaptive secure erase operation, according to some example embodiments.

DETAILED DESCRIPTION

Hereinafter, some example embodiments of the inventive concepts of the present disclosure will be described in detail with reference to the accompanying drawings.

Figure 1:
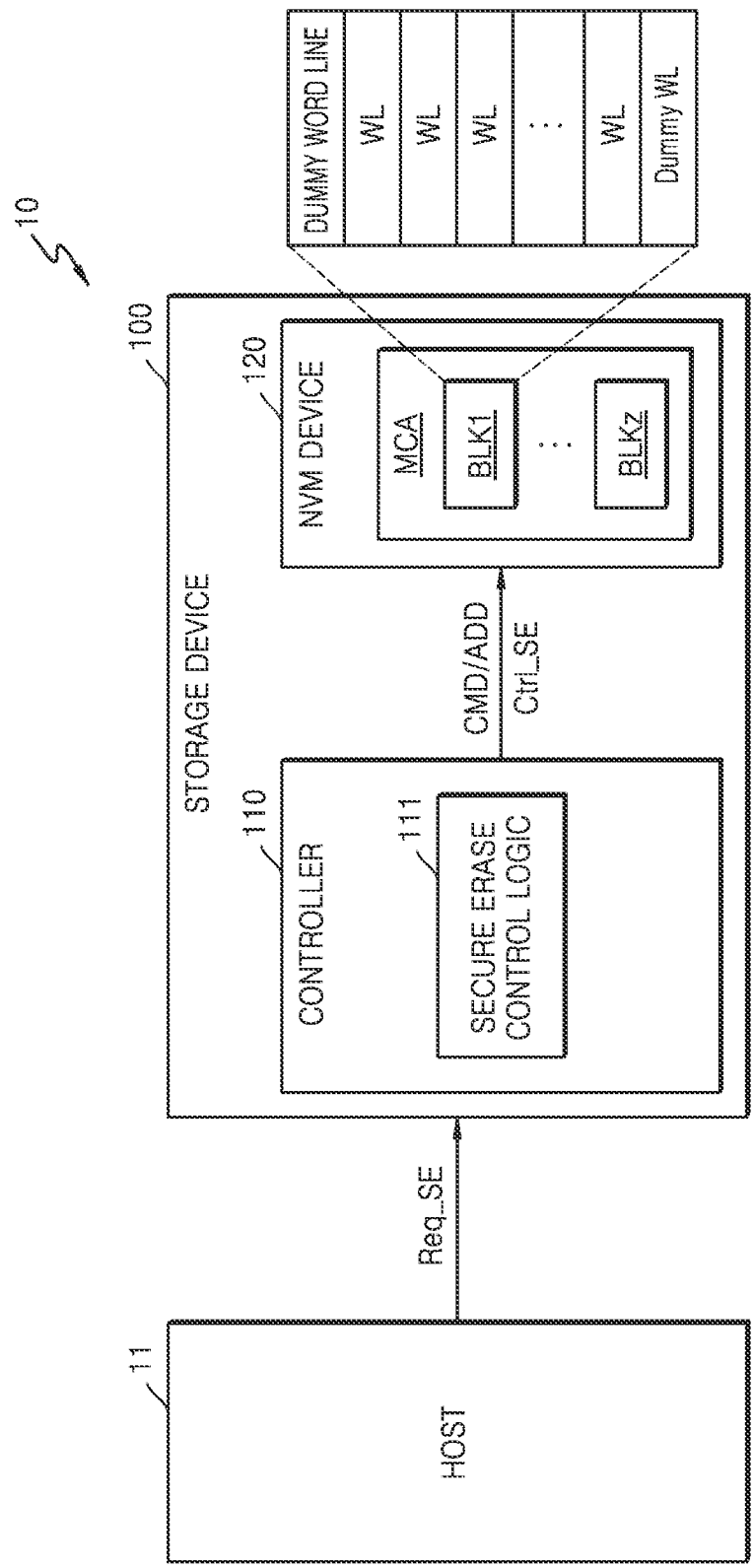
FIG. 1 is a block diagram of a storage system according to some example embodiments.

FIG. 1 is a block diagram of a storage system 10 according to some example embodiments.

Referring to FIG. 1, the storage system 10 may include a storage device 100 and a host 11. The storage device 100 may include a controller 110 and a non-volatile memory (NVM) device 120. The storage device 100 may communicate with the host 11 via various interfaces. For example, the host 11 may include an application processor (AP) or a system-on-chip (SoC). The storage device 100 may communicate with the host 11 via various interfaces, such as a universal serial bus (USB) interface, a multimedia card (MMC) interface, an embedded MMC (eMMC) interface, a peripheral component interconnection (PCI) interface, a PCI-express (PCI-E) interface, an advanced technology attachment (ATA) interface, a serial-ATA interface, a parallel-ATA interface, a small computer small interface (SCSI), an enhanced small disk interface (ESDI), an integrated drive electronics (IDE) interface, Firewire, a universal flash storage (UFS) interface, and/or an NVM express (NVMe) interface, as non-limiting examples.

The NVM device 120 may include NVM such as NAND flash memory, vertical NAND flash memory, NOR flash memory, resistive random access memory (RAM), phase-change memory, or magnetoresistive RAM.

The controller 110 may perform a control operation in response to a request from the host 11 such that data is written to or read from the NVM device 120. For example, the controller 110 may control data write and read operations of the NVM device 120 or an erase operation, in which data is erased from the NVM device 120.

The NVM device 120 may include a memory cell array. The memory cell array may include a plurality of memory blocks, e.g., first to z-th blocks BLK1 to BLKz. Each memory block (e.g., the first block BLK1) may include a plurality of word lines and at least one dummy word line. For example, memory cells connected to each word line may form a single page. User data may be stored in a page corresponding to each of the word lines, whereas data may not be stored in a page corresponding to the dummy word line.

The controller 110 may perform a control operation on the NVM device 120 based on various units. For example, a memory block may be an erase unit, and a page (or a plurality of memory blocks) may be a write unit and a read unit. The controller 110 may provide a command CMD and an address ADD to the NVM device 120 to execute various requests from the host 11.

The storage system 10 may include, for example, a personal computer (PC), a data server, network-attached storage (NAS), an Internet of things (IoT) device, or a portable electronic device, as non-limiting examples. The portable electronic device may include a laptop computer, a mobile phone, a smartphone, a tablet PC, a personal digital assistant (PDA), an enterprise digital assistant (EDA), a digital still camera, a digital video camera, an audio device, a portable multimedia player (PMP), a personal navigation device (PND), an MP3 player, a handheld game console, an e-book, or a wearable device, as non-limiting examples.

According to some example embodiments, the storage device 100 may receive, from the host 11, a secure erase request Req_SE with respect to data and, in response to the secure erase request Req_SE, support or perform a function of securely erasing the data, which is selected by a user, such that the erased data is unrestorable. The storage device 100 may receive the secure erase request Req_SE from the host 11 via various kinds of interfaces. For example, the storage device 100 may receive various requests related to a secure erase based on the value of a secure erase settings (SES) field defined in the NVMe interface.

When receiving the secure erase request Req_SE from the host 11, the storage device 100 may perform a series of processing operations to physically erase the data selected by a user. According to some example embodiments, the host 11 may include a configuration for selecting data that a user wants to securely erase. For example, a host application capable of generating a request for a secure erase may be installed in the host 11, and a user may run the host application and select data to be securely erased. The series of processing operations of securely erasing data according to some example embodiments may be defined by various terms. For convenience of description, the series of processing operations may be defined as being included in a secure erase operation in the example embodiments below.

According to some example embodiments, the controller 110 may include a secure erase control logic 111. The secure erase control logic 111 may be implemented by hardware or software. The secure erase control logic 111 may be implemented by a combination of hardware and software. For example, when the secure erase control logic 111 is at least partially implemented by software including firmware, the controller 110 may include at least one processor (not shown) configured to execute the software and memory (not shown) that stores the software, and the secure erase control logic 111 may be loaded to the memory as software. According to some example embodiments, the controller 110 may include a flash translation layer (FTL), and at least part of the function of the secure erase control logic 111 may be included in the FTL.

The secure erase control logic 111 may control a series of operations to securely erase data selected by a user. When the secure erase request Req_SE with respect to at least one block is received from the host 11, the secure erase control logic 111 may control an erase operation on data stored in the block.

In a secure erase operation on the first block, the secure erase control logic 111 may determine a secure erase state and/or deterioration (or a deterioration degree) of the first block. According to a determination result, the secure erase control logic 111 may skip the secure erase operation on the first block or perform a control operation to perform the secure erase operation on the first block. Based on the result of determining the deterioration degree of the first block, the secure erase control logic 111 may determine to perform the secure erase operation on the first block under a normal operating condition or a changed operating condition that is different from the normal operating condition. The controller 110 may control an operation of securely erasing data from the NVM device 120 by providing the command CMD, the address ADD, and the secure erase control signal Ctrl_SE to the NVM device 120 based on the control result of the secure erase control logic 111.

Usually, each time when the storage device 100 receives the secure erase request Req_SE from the host 11, the storage device 100 may repeatedly perform physical erase operations on a block that corresponds to the secure erase request Req_SE. When the secure erase request Req_SE is received from the host 11 multiple times with respect to one block, multiple physical erase operations are repeatedly performed on the block, and accordingly, the threshold voltage distribution of the memory cells of the block may be changed to a lower level than the threshold voltage distribution when a secure erase operation is performed once. The change of the threshold voltage distribution may cause the decrease of data reliability when data is written to the block afterwards.

As an example, a secure erase operation may include an erase operation on a block and a program operation (e.g., one-shot programming) for changing a threshold voltage level of erased memory cells to a certain distribution after the completion of the erase operation. In this case, when a secure erase of the block is requested multiple times, the threshold voltage distribution of the memory cells of the block may be shifted downward to a lower direction (e.g., the left) than the threshold voltage level corresponding to the certain distribution. This may cause the reliability of data to decrease in a process of storing the data to the block afterwards. In addition, the secure erase operation may be performed under different conditions than normal erase and program operations to reduce an operating time. For example, a loop limit or an operating voltage may be changed. However, because of the acceleration of the secure erase operation, the life of the memory cells may be greatly reduced and the memory cells may be greatly deteriorated.

According to some example embodiments, the state of the first block may be determined before a secure erase operation is performed on the first block, and the secure erase operation may be performed based on a determination result. For example, when the first block is not in a secure erase state but has valid data stored therein, the controller 110 may perform a control operation to physically erase the data by performing a secure erase operation (e.g., a normal secure erase operation) on the first block under a normal operating condition.

Otherwise, when the first block is in the secure erase state, the controller 110 may perform a control operation based on a result of determining the deterioration degree of the first block such that the secure erase operation on the first block is skipped or the secure erase operation is performed on the first block under an operating condition that is changed from the operating condition of the normal secure erase operation. The controller 110 may analyze the threshold voltage distribution of the memory cells of the first block or determine the deterioration degree of the first block based on the number of secure erase operations performed on the first block. In the case where the deterioration degree of the first block is low because of a relatively small number of secure erase operations performed on the first block, a secure erase operation on the first block, which is in a secure erase state, may be skipped.

In the case where the deterioration degree of the first block is high because of a relatively large number of secure erase operations performed on the first block, a secure erase operation may be performed on the first block under a changed operating condition such that the threshold voltage distribution of the memory cells of the first block may be changed to a non-deteriorated state (e.g., a state in which the threshold voltage distribution is not changed after the secure erase operation is performed). An operating condition of at least one selected from an erase operation and a program operation may be changed such that the distribution of threshold voltages resulting from a secure erase operation performed under a changed operating condition is further to the right or higher than the distribution of threshold voltages resulting from a normal secure erase operation.

According to some example embodiments, such as that described above, a secure erase operation on a block may be skipped according to a certain state of the block, and accordingly, latency related to a memory operation may be reduced, and a secure erase operation may be prevented from being repeatedly performed on one block. As a result, the deterioration of memory cells and the decrease in life of the memory cells may be reduced. In addition, a secure erase operation may be performed on a block under a changed operating condition according to a certain state of the block such that the threshold voltage distribution of the block may be appropriately positioned, and accordingly, the reliability of data may be increased.

Figure 2:
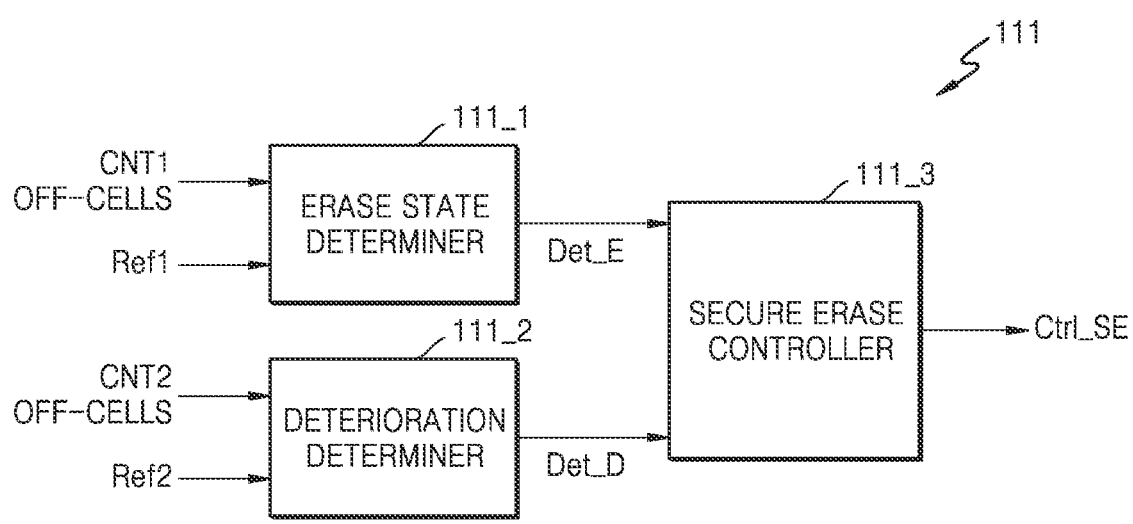
FIG. 2 is a block diagram of an implementation of a secure erase control logic in FIG. 1.

FIG. 2 is a block diagram of an implementation of the secure erase control logic 111 in FIG. 1.

Referring to FIG. 2, the secure erase control logic 111 may include an erase state determiner 111_1, a deterioration determiner 111_2, and a secure erase controller 111_3. When a secure erase request is received with respect to the first block, the erase state determiner 111_1 may determine whether the first block is in a secure erase state based on various kinds or types of received information. The erase state determiner 111_1 may compare a first reference value Ref1 with a first count value CNT1, which may be obtained by counting the number of off-cells among the memory cells of at least one page of the first block based on a certain read level (hereinafter, referred to as a first read level), and determine whether the first block is in a secure erase state. In the case where the first block has valid data stored therein, there may be multiple threshold voltage distributions, and accordingly, the first count value CNT1 corresponding to the number of off-cells may be greater than the first reference value Ref1. In the case where the first block is in a secure erase state, the first block may have a particular threshold voltage distribution, and the first count value CNT1 may be less than the first reference value Ref1 when the first read level is higher than the particular threshold voltage distribution. The erase state determiner 111_1 may output a first determination signal Det_E based on the determination result. The first determination signal Det_E may indicate a secure erase state of the first block.

The deterioration determiner 111_2 may compare a second reference value Ref2 with a second count value CNT2, which may be obtained by counting the number of off-cells among the memory cells of at least one page of the first block based on a second read level, and determine a deterioration degree of the first block. When the first block is highly deteriorated because of multiple secure erase operations performed thereon, the threshold voltage distribution of the first block may be shifted downward or to the left (or to a lower threshold voltage range), and accordingly, the second count value CNT2 corresponding to the number of off-cells counted based on the second read level may vary with a deterioration degree. The deterioration determiner 111_2 may output a second determination signal Det_D, which may indicate the deterioration or the deterioration degree of the first block, based on a result of comparing the second count value CNT2 with the second reference value Ref2.

The secure erase controller 111_3 may output the secure erase control signal Ctrl_SE for controlling a secure erase operation, based on the first determination signal Det_E and the second determination signal Det_D. According to some example embodiments, such as that described above, when the first block has valid data stored therein, the secure erase control signal Ctrl_SE for controlling a secure erase operation to be performed on the first block may be output. When the first block is in a secure erase state and has a low deterioration degree, the secure erase control signal Ctrl_SE for controlling a secure erase operation on the first block to be skipped may be output. When the first block is in a secure erase state and has a high deterioration degree, the secure erase control signal Ctrl_SE for controlling a secure erase operation to be performed on the first block under a changed operating condition that is different than a normal secure erase operation may be output.

Although FIG. 2 shows the case where a secure erase state and deterioration are determined based on results of counting off-cells, embodiments of the inventive concepts are not limited thereto. For example, the determination may be performed based on a result of counting on-cells.

Figure 3:
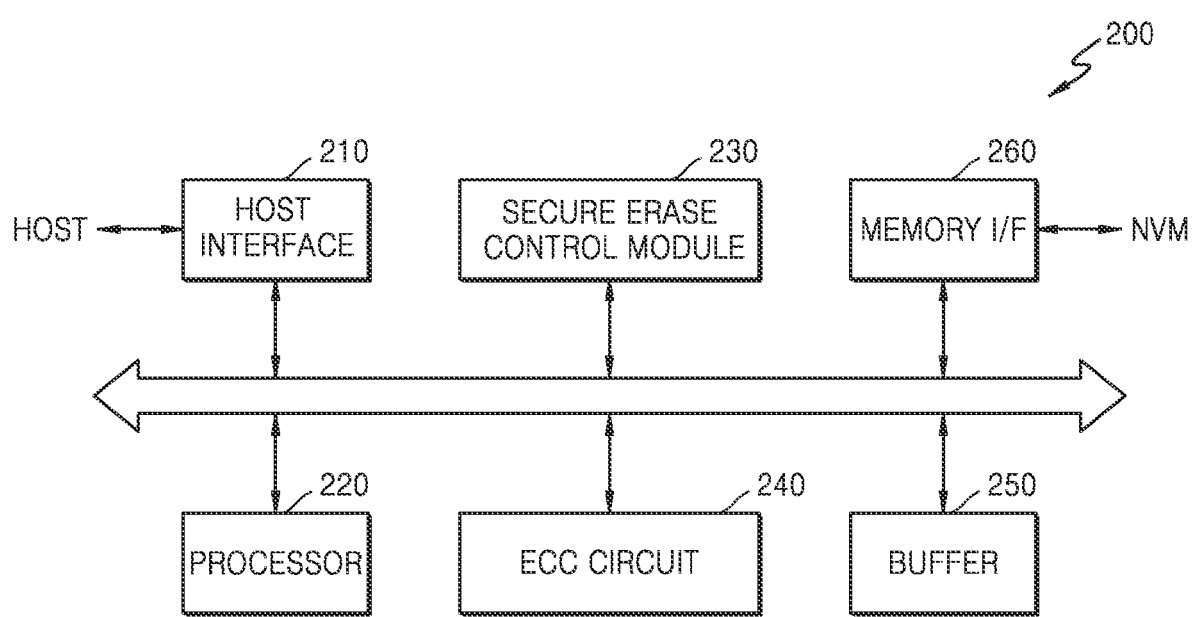
FIG. 3 is a block diagram of an implementation of a controller according to some example embodiments.

FIG. 3 is a block diagram of an implementation of a controller according to some example embodiments.

Referring to FIG. 3, a controller 200 may include a host interface 210, a processor 220, a secure erase control module 230, an error correction code (ECC) circuit 240, a buffer 250, and a memory interface 260. Although not shown in FIG. 3, the controller 200 may further include other various elements or components, such as RAM temporarily storing various kinds or types of information and read-only memory (ROM) storing various kinds or types of information in a non-volatile manner. In some embodiments, the RAM may be used as a working memory. The processor 220 may generally control the operation of the controller 200 by executing firmware loaded to the RAM. The RAM may include at least one of various kinds of memory, e.g., cache memory, dynamic RAM (DRAM), static RAM (SRAM), phase-change RAM (PRAM), and flash memory devices. An FTL may be loaded to the RAM as firmware, and various functions related to flash memory operations may be performed by driving the FTL.

The host interface 210 may communicate with a host via the various interfaces described above. The memory interface 260 may provide physical connection between the controller 200 and an NVM device. A command, an address, data, and the like may be transmitted between the controller 200 and the NVM device via the memory interface 260. Data requested by the host to be written to the NVM device and data read from the NVM device may be temporarily stored in the buffer 250. The ECC circuit 240 may perform ECC encoding and/or decoding on data to be written and/or data that has been read, and may detect and correct an error in the data.

The secure erase control module 230 may include elements configured to control a secure erase control operation, according to some example embodiments, such as those described above. For example, when the secure erase control operation is performed based on software, the secure erase control module 230 may, as firmware, include at least one program and may be loaded to the RAM of the controller 200 and executed by the processor 220. As the processor 220 executes the secure erase control module 230, the erase state and/or deterioration of a block that corresponds to a secure erase request may be determined, and a control operation may be performed to skip a secure erase operation or perform a secure erase operation under a changed operating condition.

Figure 4:
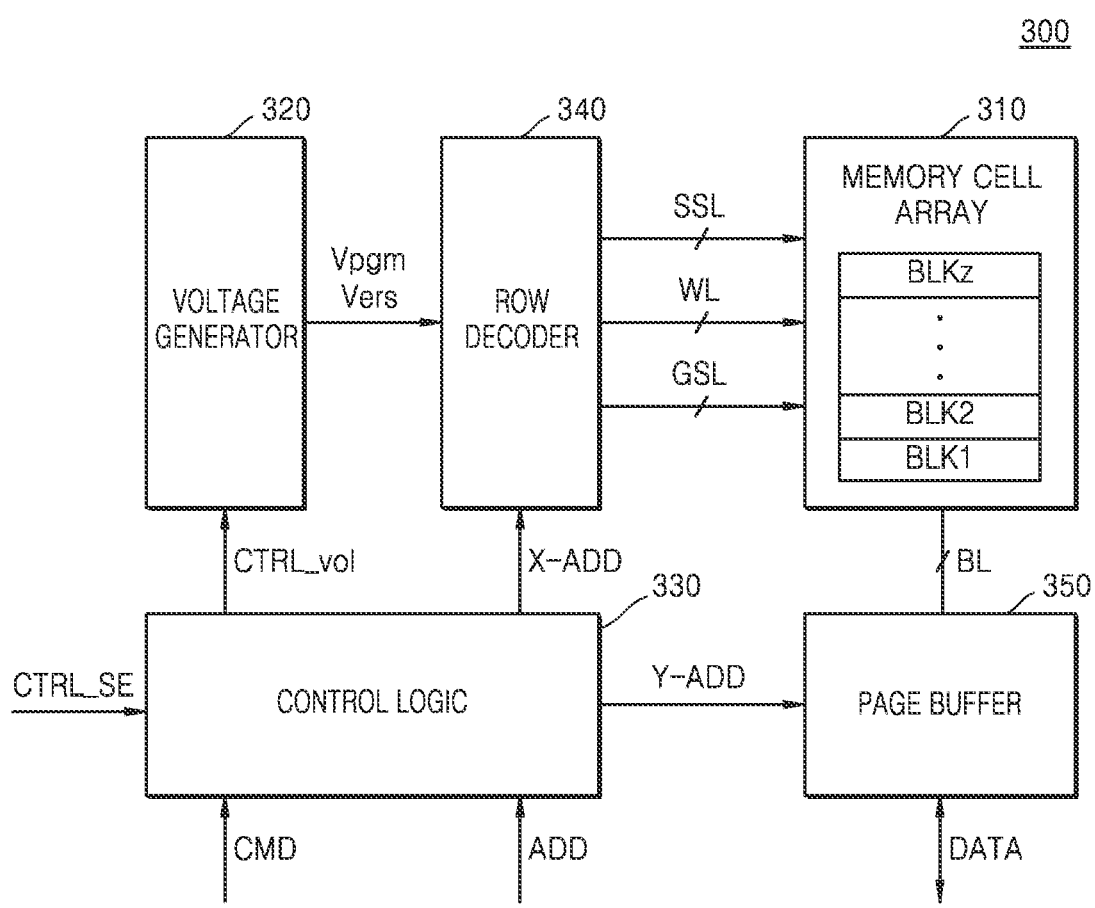
FIG. 4 is a block diagram of an implementation of a non-volatile memory device according to some example embodiments.

FIG. 4 is a block diagram of an implementation of an NVM device according to some example embodiments. FIG. 4 illustrates an implementation of a flash memory device as an NVM device.

Referring to FIG. 4, an NVM device 300 may include a memory cell array 310, a voltage generator 320, a control logic 330, a row decoder 340, and a page buffer 350. The memory cell array 310 may include a plurality of blocks, e.g., the first to z-th blocks BLK1 to BLKz. The memory cells of the first to z-th blocks BLK1 to BLKz may be connected to word lines WL, string selection lines SSL, ground selection lines GSL, and bit lines BL. The memory cell array 310 may be connected to the row decoder 340 through the word lines WL, the string selection lines SSL, and the ground selection lines GSL and connected to the page buffer 350 through the bit lines BL. Each of the memory cells may store one or more bits. For example, each memory cell may correspond to a multi-level cell (MLC), a triple-level cell (TLC), or a quad-level cell (QLC).

The control logic 330 may output various internal control signals for controlling program, read, and erase operations of the memory cell array 310 based on the command CMD, the address ADD, and a control signal, which are received from a controller (not shown in FIG. 4). For example, the control logic 330 may output a voltage control signal CTRL vol for controlling the levels of various voltages generated by the voltage generator 320 and provide a row address X-ADD to the row decoder 340 and a column address Y-ADD to the page buffer 350. The voltage generator 320 may generate various voltages used by the NVM device 300. For example, the voltage generator 320 may generate a program voltage Vpgm used for a program operation and an erase voltage Vers used for an erase operation.

According to some example embodiments, the control logic 330 may receive the secure erase control signal Ctrl_SE from the controller and perform a secure erase operation based on the secure erase control signal Ctrl_SE. According to some example embodiments, such as those described above, the controller may provide the secure erase control signal Ctrl_SE such that a secure erase operation is performed on a block or skipped, or the controller may provide the secure erase control signal Ctrl_SE such that a secure erase operation is performed on the block under a changed operating condition. The control logic 330 may output the voltage control signal CTRL vol based on the secure erase control signal Ctrl_SE to adjust the level of the program voltage Vpgm and/or the level of the erase voltage Vers.

Figure 5:
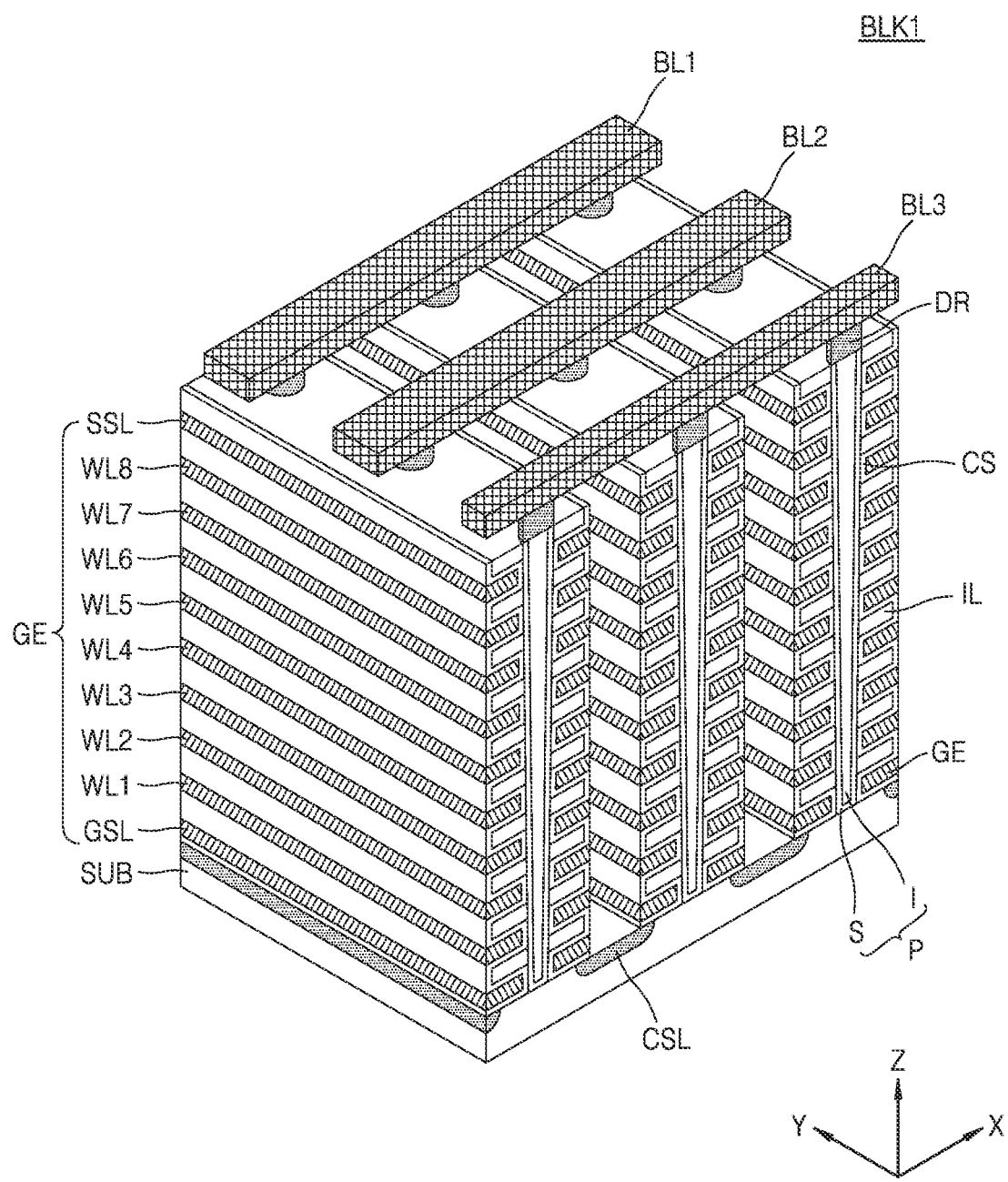
FIG. 5 is a perspective view of a block in FIG. 4, according to an embodiment.

FIG. 5 is a perspective view of the first block BLK1 in FIG. 4, according to some example embodiments.

Referring to FIG. 5, the first block BLK1 may be vertically formed on a substrate SUB. The substrate SUB may have a first conductivity type (e.g., a p-type). A common source line CSL may extend in the substrate SUB in a second horizontal direction Y and may be doped with impurities of a second conductivity type (e.g., an n-type). In a region of the substrate SUB between two adjacent common source lines CSL, a plurality of insulating layers IL may extend in the second horizontal direction Y and may be sequentially provided in a vertical direction Z. The insulating layers IL may be separated from each other by a certain distance in the vertical direction Z. For example, the insulating layers IL may include an insulating material such as silicon oxide.

In the region of the substrate SUB between two adjacent common source lines CSL, a plurality of pillars P may pass through the insulating layers IL in the vertical direction Z. The plurality of pillars P may be arranged in a first horizontal direction X. For example, the pillars P may pass through the insulating layers IL and may be in contact with the substrate SUB. In greater detail, each pillar may include a surface layer S and an inner layer I. The surface layer S of each pillar P may include a silicon material of the first conductivity type and may function as a channel region. The inner layer I of each pillar P may include an insulating material such as silicon oxide or an air gap.

In the region between two adjacent common source lines CSL, a charge storage layer CS may be provided along the exposed surfaces of the insulating layers IL, the pillars P, and the substrate SUB. The charge storage layer CS may include a gate insulating layer (which may be referred to as a "tunneling insulating layer"), a charge trap layer, and a blocking insulating layer. For example, the charge storage layer CS may have an oxide-nitride-oxide (ONO) structure. In the region between two adjacent common source lines CSL, gate electrodes GE, such as a ground selection line GSL, a string selection line SSL, and word lines WL1 to WL8, may be provided on an exposed surface of the charge storage layer CS.

Drains or drain contacts DR may be respectively provided on the pillars P. For example, the drains or drain contacts DR may include a silicon material that is doped with impurities of the second conductivity type. Bit lines BL1 to BL3 may extend on the drains or drain contacts DR in the first horizontal direction X and may be separated from each other by a certain distance in the second horizontal direction Y.

Although not shown in FIG. 5, the first block BLK1 may include at least one dummy word line. For example, the first block BLK1 may further include at least one dummy word line (or upper dummy line) above the word lines WL1 to WL8 and at least one dummy line (or lower dummy line) below the word lines WL1 to WL8. When the threshold voltage distribution of memory cells connected to a dummy word line is shifted downward or to the left (or to a lower threshold voltage range) because of deterioration of the memory cells, the memory cells connected to the dummy word line may have an excessive turn-on state during data programming, and accordingly, a relatively larger amount of current flows compared to when the deterioration of the memory cells is low. As a result, the threshold voltage distribution characteristics of memory cells connected to the word lines WL1 to WL8 may be deteriorated.

According to some example embodiments, when a secure erase operation is performed under a changed operating condition, the secure erase operation may further include a program operation to change the threshold voltage distribution of the memory cells connected to the dummy word line.

Figure 6:
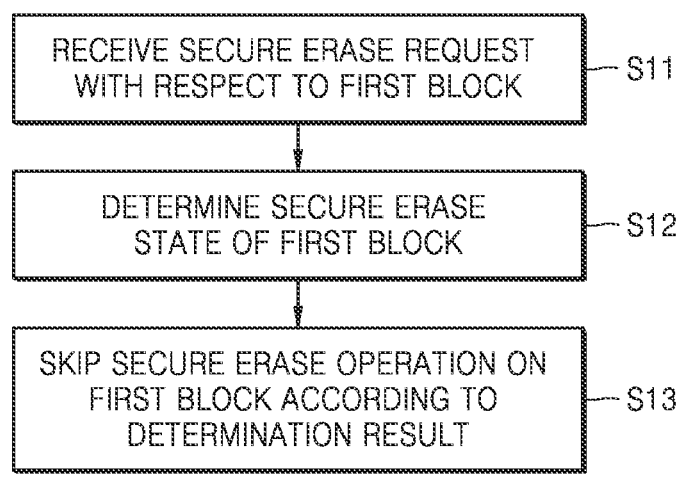
FIGS. 6 and 7 are flowcharts of an operating method of a storage device, according to some example embodiments.
Figure 7:
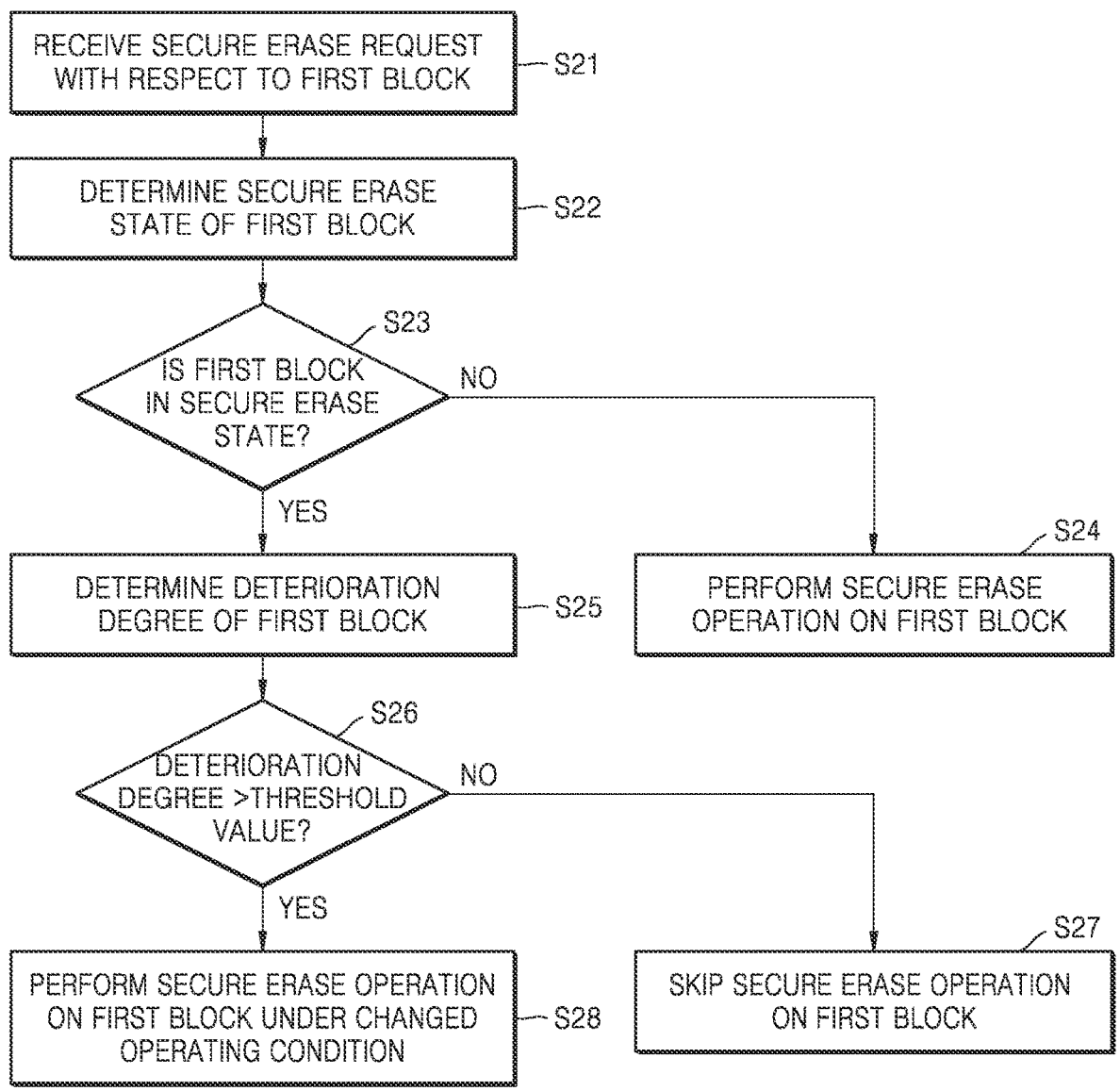

FIGS. 6 and 7 are flowcharts of an operating method of a storage device, according to some example embodiments.

Referring to FIG. 6, the storage device may include a controller and an NVM device and may control a secure erase operation on at least one block of the NVM device in response to a request from a host. In some example embodiments, the storage device may perform a secure erase operation on at least two blocks of the NVM device in response to a request from the host.

The storage device may receive a secure erase request with respect to the first block from the host in operation S11 and may determine a secure erase state of the first block by checking various kinds of information about the first block or analyzing the threshold voltage distribution of the memory cells of the first block in operation S12. In the case where a secure erase operation has been performed on the first block, the memory cells of the first block may have a certain threshold voltage distribution. In the case where a secure erase operation includes an erase operation on memory cells and an operation of programming the memory cells to a certain threshold voltage state, the threshold voltage distribution of the memory cells of the first block may be positioned further to the right (e.g., in a higher range) than the threshold voltage distribution obtained right after the erase operation is completed. In the case where the first block has valid data stored therein without undergoing a secure erase operation, the memory cells of the first block may have multiple threshold voltage distributions.

In some example embodiments, data may be read from at least one page of the first block, and a secure erase state of the first block may be determined based on a result of counting off-cells (or, in some embodiments, on-cells) among memory cells corresponding to the at least one page. When data is read from the first block based on a voltage having a certain read level, the number of off-cells (or, in some embodiments, on-cells) when the first block is in a secure erase state may be different from the number of off-cells (or, in some embodiments, on-cells) when the first block has valid data stored therein. In the case where the certain read level is higher than a threshold voltage distribution resulting from the secure erase operation, there may be no or a relatively small number of off-cells when the first block is in the secure erase state, whereas there may be a relatively large number of off-cells when the first block has valid data stored therein.

Based on the determination result described above, a secure erase operation on the first block may be skipped in operation S13. When the first block is in the secure erase state, a secure erase operation may not be performed on the first block and is skipped, and accordingly, the deterioration of the first block, which is caused by repeatedly performing a secure erase operation on the first block that is in the secure erase state, may be reduced or prevented. Otherwise, when the first block has valid data stored therein, the valid data may be physically erased from the first block by performing a secure erase operation on the first block.

FIG. 7 shows the case where an adaptive secure erase operation is performed according to some example embodiments. According to some example embodiments, such as those described above, when the secure erase operation of FIG. 6 is defined as a normal secure erase operation, an operating condition of at least one selected from an erase operation and a program operation in the adaptive secure erase operation may be differently set compared to that in the normal secure erase operation. Through this operation, a change in a threshold voltage distribution resulting from the adaptive secure erase operation may be different from that resulting from the normal secure erase operation.

Referring to FIG. 7, the storage device may receive a secure erase request with respect to the first block from the host in operation S21 and perform a series of operations (e.g., an off-cell counting operation and a comparison operation) to determine a secure erase state of the first block, according to the example embodiments described above, in operation S22. Whether the first block is in the secure erase state may be determined based on the series of operations in operation S23. When the first block is not in the secure erase state (or when the first block has valid data stored therein), a secure erase operation may be performed on the first block in operation S24.

Otherwise, when the first block is in the secure erase state, a series of operations may be performed to determine a deterioration degree of the first block in operation S25. When many secure erase operations have been repeatedly performed on the first block according to the embodiments described above, the amount of shift of the threshold voltage distribution of the memory cells of the first block may be relatively large, and accordingly, the deterioration degree of the first block may be determined by analyzing the threshold voltage distribution of the memory cells of the first block.

Whether the deterioration degree of the first block exceeds a certain threshold value may be determined in operation S26. When the deterioration degree of the first block does not exceed the certain threshold value, it may be determined that the first block has not yet been greatly deteriorated, and a secure erase operation on the first block may be skipped in operation S27. Otherwise, when the deterioration degree of the first block exceeds the certain threshold value, it may be determined that the first block has been greatly deteriorated, and a secure erase operation may be performed on the first block under a changed operating condition in operation S28. When the first block has been greatly deteriorated, the threshold voltage distribution of the memory cells of the first block may have been shifted downward or to the left (or to a lower voltage distribution range), and accordingly, an operating condition may be set such that the threshold voltage distribution of the memory cells of the first block may be shifted to an undeteriorated distribution (e.g., a distribution having a deterioration degree that is less than the threshold value) after a secure erase operation is performed.

Hereinafter, some specific example operations according to some example embodiments are described.

Figure 8:
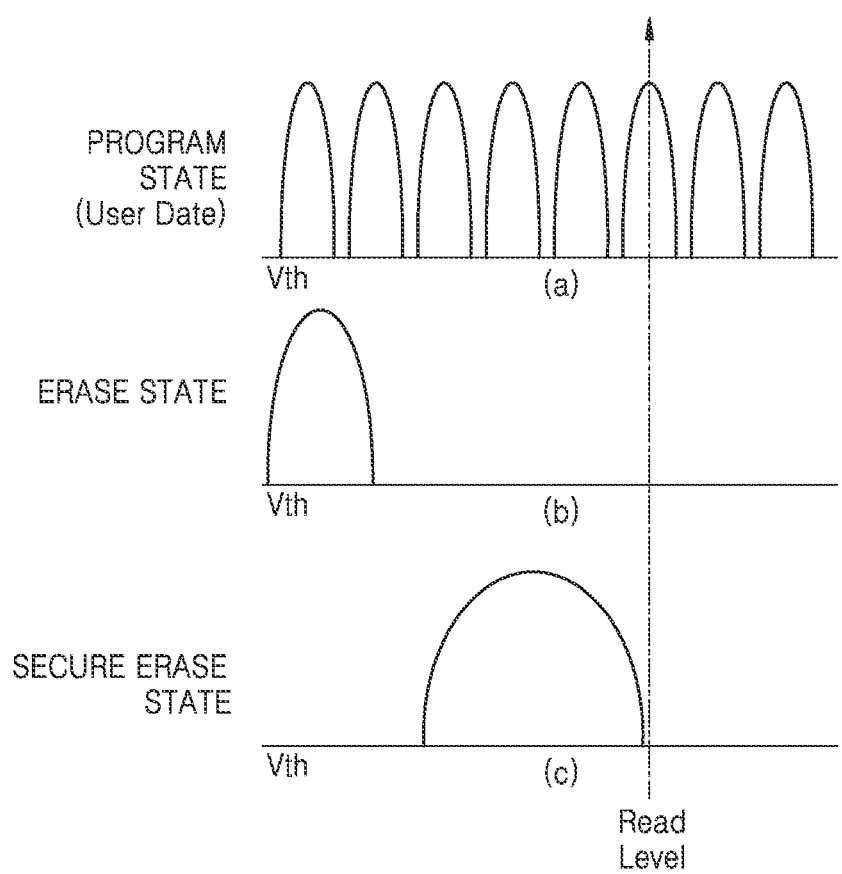
FIG. 8 is a diagram illustrating a threshold voltage distribution according to each state of a storage device.

FIG. 8 is a diagram illustrating a threshold voltage distribution according to each state of a storage device. Referring to FIG. 8, the memory cells of the storage device correspond to TLCs, and accordingly, when user data has been effectively stored in the memory cells, the memory cells may have eight threshold voltage distributions. According to some example embodiments, a secure erase operation may include an erase operation and a one-shot program operation.

As shown in (a) of FIG. 8, when user data has been effectively stored in memory cells, the memory cells may have multiple threshold voltage distributions having levels of threshold voltages Vth that differ from each other. As shown in (b) of FIG. 8, when memory cells are in an erase state, the memory cells may have a single threshold voltage distribution corresponding to the erase state. As shown in (c) of FIG. 8, when memory cells are in a secure erase state, an erase operation and a one-shot program operation are sequentially performed on the memory cells, and accordingly, the memory cells may have a single threshold voltage distribution having a higher threshold voltage level than in the erase state. When a data write is requested with respect to a block that has undergone a secure erase operation including the one-shot program operation, an erase operation may be performed on the block, and thereafter, a program operation for forming a threshold voltage distribution corresponding to actual user data may be performed on the block.

To determine the state of a block (e.g., the first block) corresponding to a secure erase request, according to some example embodiments such as those described above, a read operation may be performed on the first block (or at least one page of the first block) using a read level having a certain value, and an operation of counting the number of off-cells or on-cells based on read data may be performed. In the case where the read level in FIG. 8 is used, there may be a relatively large number of off-cells when the first block has user data stored therein, whereas there may be no or a relatively small number of off-cells when the first block is in the secure erase state.

Figure 9A:
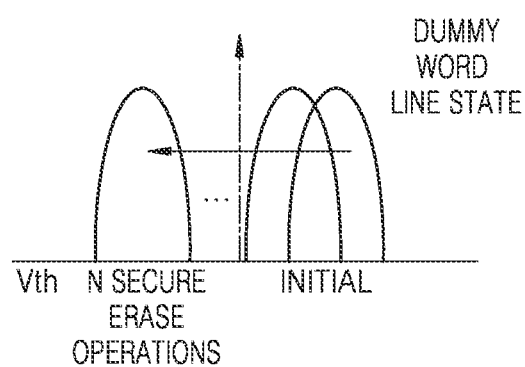
FIGS. 9A and 9B are diagrams illustrating an example of determining the deterioration degree of a block.
Figure 9B:
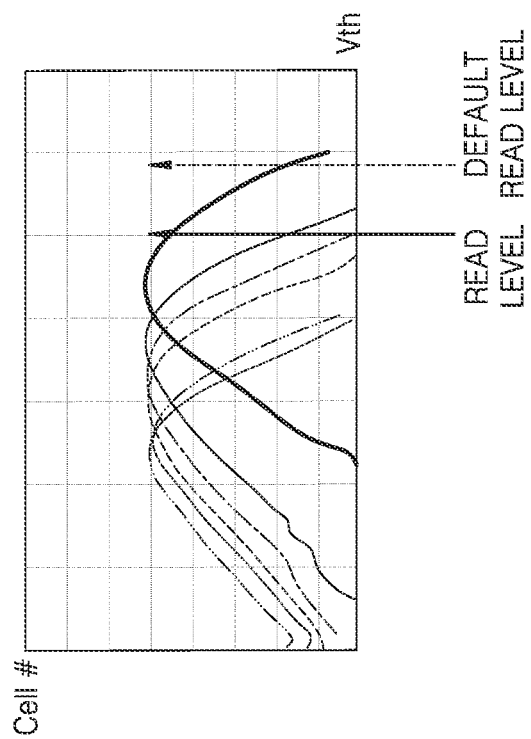

FIGS. 9A and 9B are diagrams illustrating an example of determining the deterioration degree of a block. FIGS. 9A and 9B show an example of a threshold voltage distribution of memory cells connected to a dummy word line of a block.

Referring to FIG. 9A, an erase operation or a program operation may not be performed on the dummy word line during a secure erase operation, and accordingly, the memory cells connected to the dummy word line may have a single threshold voltage distribution. As a secure erase operation is repeatedly performed on the block, interference may occur in the memory cells connected to the dummy word line, and accordingly, the threshold voltage distribution of the memory cells connected to the dummy word line may be shifted downward or to the left (e.g., a lower threshold voltage range). For example, as the number of secure erase operations performed on the block increases to N (where N is an integer of at least 2), the amount of shift of the threshold voltage distribution of the memory cells connected to the dummy word line may increase.

FIG. 9B illustrates an example of determining the deterioration degree of the block based on the threshold voltage distribution of the memory cells connected to the dummy word line. In the example of FIG. 9B, a read level may be changed based on a default read level during a read operation on the memory cells connected to the dummy word line, and off-cells resulting from the read operation are counted.

As shown in FIG. 9B, as the number of secure erase operations performed on the block increases, the threshold voltage distribution of the memory cells connected to the dummy word line may be shifted downward or to the left, and the number of off-cells may be differently counted based on a certain read level according to the deterioration degree of the memory cells connected to the dummy word line. For example, the deterioration degree of the block may be determined by determining a changed read level, which may give at least a certain value (e.g., 100) as an off-cell difference between the number of off-cells based on the default read level and the number of off-cells based on the changed read level.

The numerical values of the read level in FIG. 9B may correspond to offsets related to the default read level. When a secure erase operation is not performed on the block, the threshold voltage distribution of the memory cells connected to the dummy word line is positioned on the rightmost side in the example of FIG. 9B. In a process of performing a read operation while changing the read level, when the read operation is performed using a read level that is 0.1 V higher than the default read level, the off-cell difference may be determined to be 100 or greater. When deterioration occurs due to a secure erase operation performed on the block, a read level giving an off-cell difference of at least 100 may gradually decrease. In the case where one secure erase operation has been performed on the block, the off-cell difference may be at least 100 when a read operation is performed on the block using a read level that is 0.3 V lower than the default read level.

Similarly, in the case where two secure erase operations have been performed on the block, the off-cell difference may be at least 100 when a read operation is performed on the block using a read level that is 0.5 V lower than the default read level. In the case where three secure erase operations have been performed on the block, the off-cell difference may be at least 100 when a read operation is performed on the block using a read level that is 0.7 V lower than the default read level. In the case where four secure erase operations have been performed on the block, the off-cell difference may be at least 100 when a read operation is performed on the block using a read level that is 0.8 V lower than the default read level.

The deterioration degree of the memory cells connected to the dummy word line may be determined based on the read level determined using the method described above. When the deterioration degree of the memory cells connected to the dummy word line is high, it may be determined that the deterioration degree of the block including the memory cells is high. Based on a determination result, the adaptive secure erase operation may be performed according to the example embodiments described above.

Although the numerical values in one case are shown in FIGS. 9A and 9B, the present disclosure is not limited thereto. The deterioration degree of a block may be determined using various methods based on other various values. For example, without changing a read level, off-cells may be counted using one particular read level or a small number of read levels, and the deterioration degree may be determined based on a count value. Although FIGS. 9A and 9B illustrate the case where off-cells are counted among the memory cells connected to the dummy word line, in some embodiments on-cells may be counted among the memory cells connected to the dummy word line, or off-cells (or on-cells) may be counted among memory cells connected to a normal word line.

Figure 10:
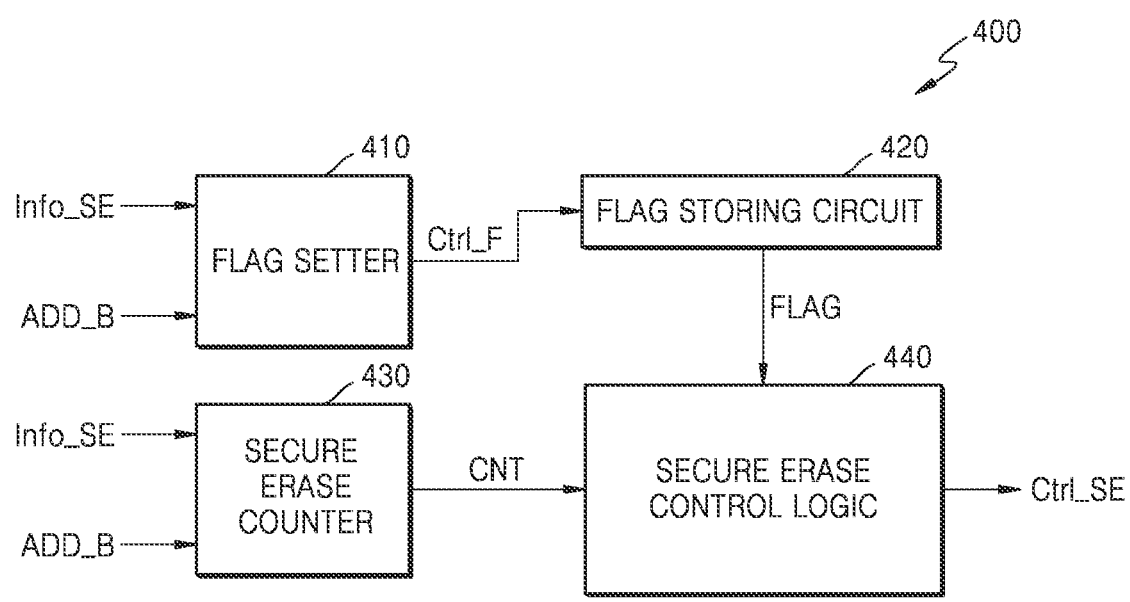
FIG. 10 is a block diagram of a storage device according to some example embodiments.

Hereinafter, according to some example embodiments, the case where a secure erase operation is skipped or an adaptive secure erase operation is performed, based on a flag and an operation of counting the number of secure erase operations, is described. FIG. 10 is a block diagram of a storage device 400 according to some example embodiments.

Referring to FIG. 10, the storage device 400 or a controller of the storage device 400 may include a flag setter 410, a flag storing circuit 420, a secure erase counter 430, and a secure erase control logic 440. Various elements in FIG. 10 may be implemented by hardware, software, or a combination thereof, and at least some of the various elements may be implemented by firmware executable by a processor.

The flag setter 410 may receive a secure erase information Info_SE, which may indicate that a secure erase request is received, and a block address ADD_B indicating a block corresponding to the secure erase request. The flag setter 410 may output, based on the secure erase information Info_SE and the block address ADD_B, a flag control signal Ctrl_F for changing a flag stored in the flag storing circuit 420. For example, an NVM device of the storage device 400 may include a plurality of blocks, and a flag indicating whether a secure erase operation has been performed on each of the blocks may be stored in the flag storing circuit 420. When a secure erase operation has been performed on the first block among the blocks, a flag corresponding to the first block may be set to 1. Otherwise, when no secure erase operation has been performed on the first block, the flag corresponding to the first block may be set to 0. In some example embodiments, the flags of the blocks may be stored in a certain storage area (e.g., a meta area) of the NVM device, and flags read from the NVM device may be loaded to the flag storing circuit 420.

The secure erase counter 430 may include a plurality of counters to count the number of secure erase operations performed on each of the blocks. The secure erase counter 430 may receive the secure erase information Info_SE and the block address ADD_B and count the number of secure erase operations performed on a block corresponding to the block address ADD_B. The secure erase counter 430 may output a secure erase count value CNT indicating a result of counting performed with respect to each block.

The secure erase control logic 440 may output the secure erase control signal Ctrl_SE for controlling a secure erase operation according to the example embodiments described above, based on the flag and the secure erase count value CNT. For example, the secure erase control logic 440 may determine based on the flag whether a secure erase operation has been performed on the first block and output, based on a determination result, the secure erase control signal Ctrl_SE to allow a secure erase operation to be performed or skipped. The secure erase control logic 440 may also determine based on the secure erase count value CNT whether the deterioration degree of the first block has increased because of a repetition of secure erase operations on the first block. Based on a determination result, the secure erase control logic 440 may output the secure erase control signal Ctrl_SE for performing a normal secure erase operation or an adaptive secure erase operation.

Although the storage device 400 controls a secure erase operation using both the flag and the secure erase count value CNT in the example embodiments described with reference to FIG. 10, the present disclosure is not limited thereto. For example, the storage device 400 may include elements related to only the flag or only the secure erase count value CNT and control a secure erase operation based on either the flag or the secure erase count value CNT.

Figure 11:
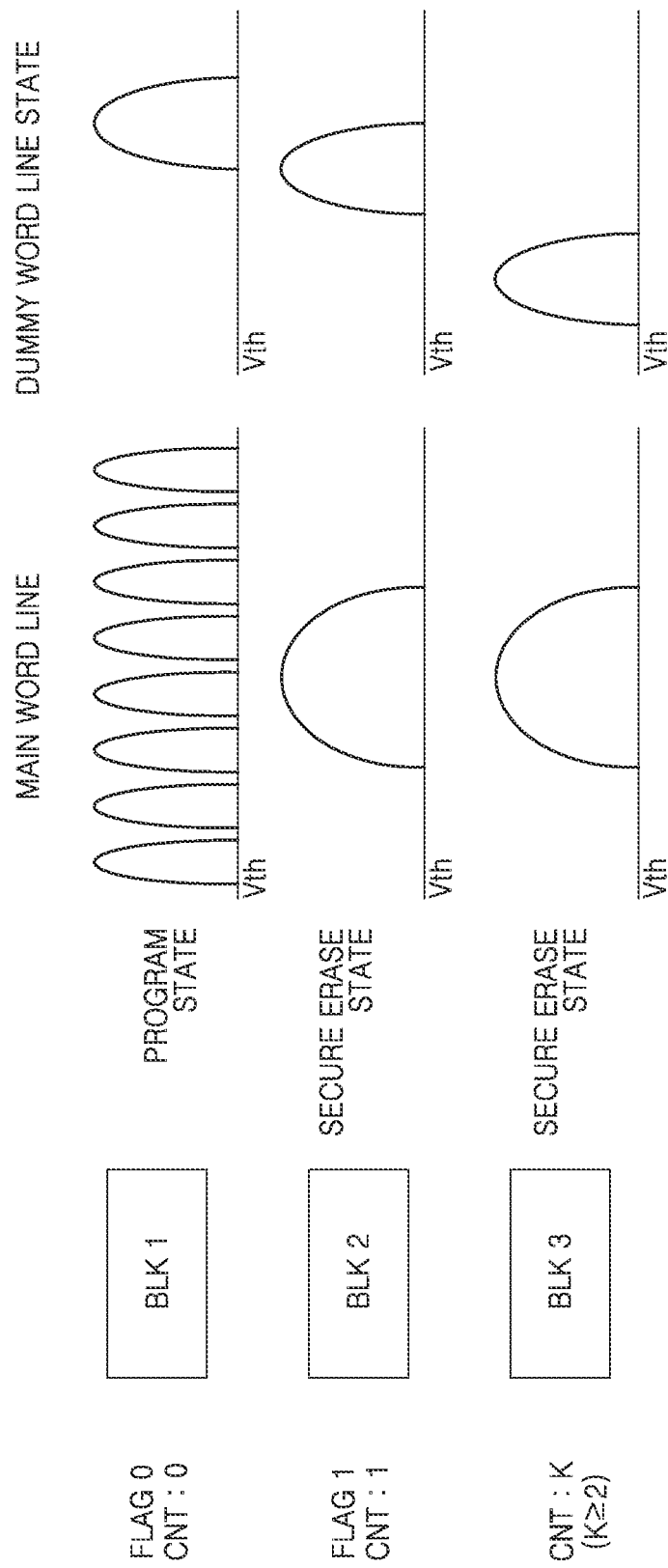
FIGS. 11 to 13 are diagrams showing an example operation of the storage device of FIG. 10.
Figure 12:
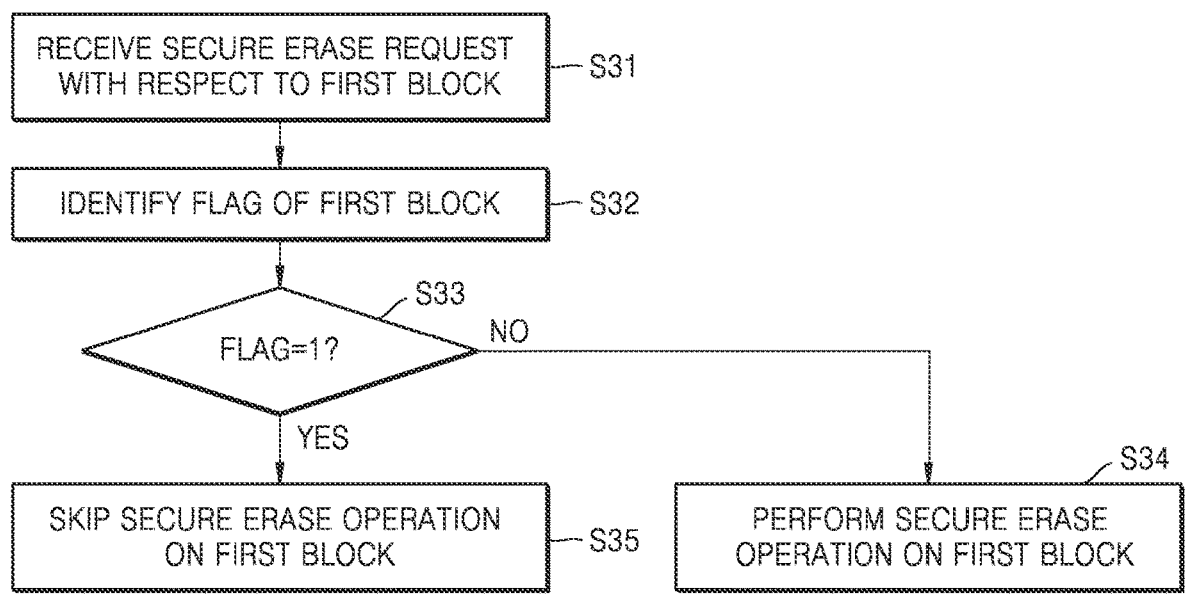
Figure 13:
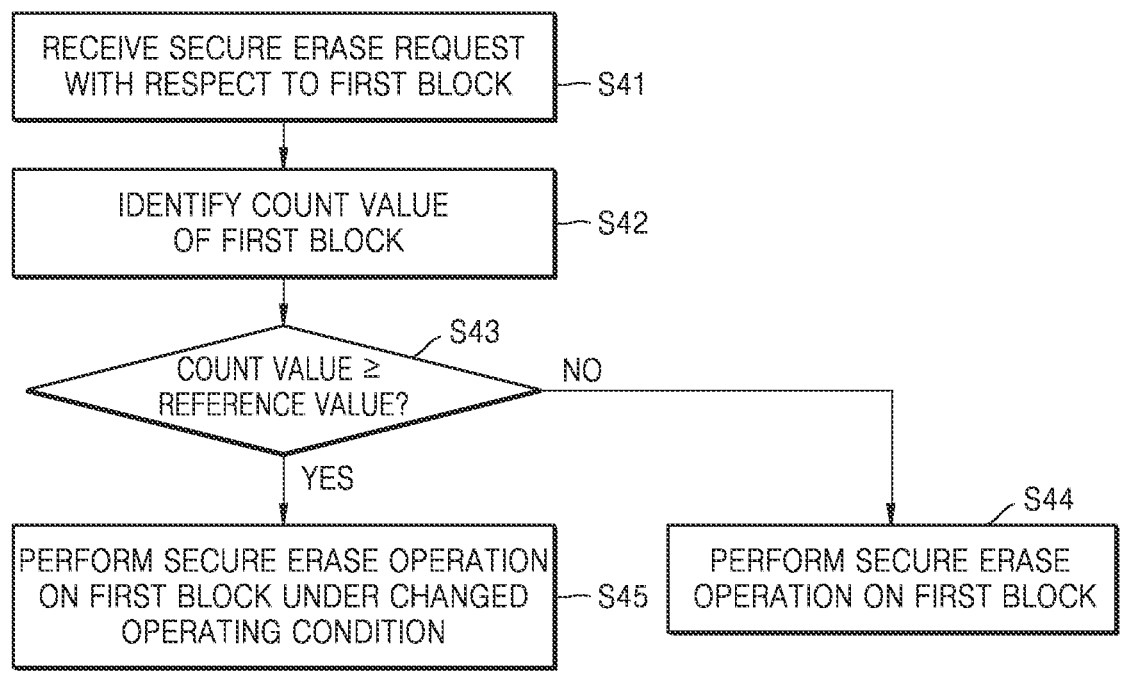

FIGS. 11 to 13 are diagrams showing an example operation of the storage device 400 of FIG. 10. In the example embodiments described with reference to FIGS. 11 to 13, the storage device 400 may perform various determining operations based on at least one selected from an element related to the flag and an element related to the secure erase count value CNT.

Referring to FIGS. 10 and 11, the flag and the secure erase count value CNT of each of the first to third blocks BLK1, BLK2, and BLK3 are shown. For example, when the flag or the secure erase count value CNT corresponding to the first block BLK1 is 0, it may indicate that the first block BLK1 has undergone no secure erase operation and has valid user data stored therein, and the memory cells of the first block BLK1 may have multiple threshold voltage distributions. In addition, threshold voltages of memory cells connected to dummy word lines of the first block BLK1 may include one distribution. The threshold voltage distribution of the dummy word lines may not have been shifted downward or to the left or may have been shifted only slightly downward or to the left.

When the flag or the secure erase count value CNT corresponding to the second block BLK2 is 1, it may indicate that the second block BLK2 has undergone a secure erase operation once, and accordingly, the memory cells of the second block BLK2 may include a threshold voltage distribution corresponding to a secure erase state. In addition, threshold voltages of memory cells connected to dummy word lines of the second block BLK2 may have been shifted downward or further to the left than those of the memory cells connected to the dummy word lines of the first block BLK1.

When the secure erase count value CNT corresponding to the third block BLK3 is K that is at least 2, it may indicate that the third block BLK3 has undergone a secure erase operation at least twice, and accordingly, the memory cells of the third block BLK3 may include a threshold voltage distribution corresponding to the secure erase state. Because many secure erase operations have been performed on the third block BLK3, the deterioration degree of the third block BLK3 may be relatively high, and accordingly, threshold voltages of memory cells connected to dummy word lines of the third block BLK3 may have been shifted further downward or to the left than those of the memory cells connected to the dummy word lines of the first block BLK1 that has not undergone a secure erase operation and those of the memory cells connected to the dummy word lines of the second block BLK1 that has undergone one secure erase operation.

FIG. 12 is an example flowchart of a method of controlling a secure erase operation based on a flag.

Referring to FIG. 12, when a secure erase request is received with respect to a first block among a plurality of blocks of the storage device in operation S31, a flag of the first block may be identified in operation S32. Whether the flag of the first block is 1 may be determined in operation S33. When the flag of the first block is not 1 (e.g., is 0), it means that the first block has not undergone a secure erase operation or has valid user data stored therein, and accordingly, a secure erase operation may be performed on the first block in operation S34. Otherwise, when the flag of the first block is 1, it means that the first block has undergone a secure erase operation, and accordingly, a secure erase operation on the first block may be skipped in operation S35.

FIG. 13 is an example flowchart of a method of controlling a secure erase operation based on a count value.

Referring to FIG. 13, when a secure erase request is received with respect to a first block among a plurality of blocks of the storage device in operation S41, a count value of the first block among respective count values of the blocks may be identified in operation S42. Whether the count value of the first block is greater than or equal to a reference value may be determined in operation S43. When the count value of the first block is less than the reference value, it means that the first block has undergone no or a small number of secure erase operations, and accordingly, a secure erase operation (e.g., a normal secure erase operation) may be performed on the first block in operation S44. Otherwise, when the count value of the first block is greater than or equal to the reference value, it means that the first block has undergone a relatively large number of secure erase operations, and accordingly, a secure erase operation may be performed on the first block under a changed operating condition, according to the adaptive secure erase operation of the embodiment described above, in operation S45.

In some example embodiments, after the secure erase operation is performed on the first block under the changed operating condition, the deterioration degree of the first block may be decreased, and accordingly, the count value of the first block may be reset or changed. For example, when the first block has a threshold voltage distribution, which corresponds to the case where one secure erase operation is performed, after the secure erase operation is performed on the first block under the changed operating condition, the count value of the first block may be changed to 1.

Figure 14B:
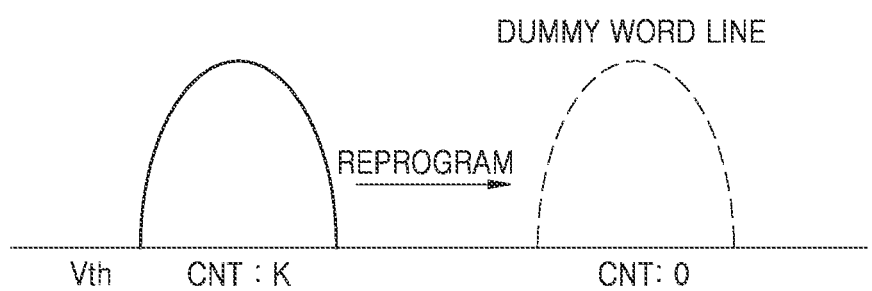

FIGS. 14A and 14B are diagrams showing an example of operating conditions of an adaptive secure erase operation, according to some example embodiments. FIG. 14A shows an example of the case where an erase voltage, a program voltage, an erase time, and a program time are adjusted, as operating conditions of a secure erase operation, according to a secure erase count value corresponding to a result of counting secure erase operations performed on each block. The numerical values in FIG. 14A may correspond to offsets from an erase voltage, a program voltage, an erase time, and a program time of a normal secure erase operation. FIG. 14B shows an example of the case where a reprogram operation is performed on a dummy word line during an adaptive secure erase operation.

Referring to FIG. 14A, an erase operation and a program operation may be performed in an adaptive secure erase operation. Each of the erase operation and the program operation may be performed during a certain time period (or a certain number of loops). As described above, when the adaptive secure erase operation is performed, operating conditions may be set such that the threshold voltage distribution of memory cells is positioned further to the right than that when a normal secure erase operation is performed.

As described above, when a secure erase count value of the first block increases, the amount of shift downward or to the left of the threshold voltage distribution of the memory cells of the first block may increase. Therefore, when the secure erase count value increases, the operating conditions of the adaptive secure erase operation may be set such that the threshold voltage distribution of the memory cells resulting from the adaptive secure erase operation is positioned further to the right (or higher) than that resulting from a normal secure erase operation.

For example, when the respective values of the erase voltage Vers, an erase time, the program voltage Vpgm, and a program time of a normal secure erase operation are defined as default values, offsets may be set differently according to a secure erase count value. For example, when no secure erase operation has been performed on the first block (that is, when the secure erase count value is 0), a secure erase operation may be performed according to the erase voltage Vers, the erase time, the program voltage Vpgm, and the program time, which respectively correspond to the default values.

Otherwise, when the secure erase count value of a block to undergo a secure erase operation increases, the level of the erase voltage Vers may be decreased from a default value. FIG. 14A shows an example in which the level of the erase voltage Vers is decreased 100 mV or 200 mV from the default value. As the level of the erase voltage Vers is decreased, the amount of shift downward or to the left of the threshold voltage distribution of memory cells by an erase operation may be decreased. In addition, as the secure erase count value of a block to undergo a secure erase operation increases, the erase time (or an erase loop count) may be reduced. As the erase time or the erase loop count is reduced, the amount of shift to the lower range of the threshold voltage distribution of the memory cells by the erase operation may be decreased.

Moreover, as the secure erase count value of a block to undergo a secure erase operation increases, the level of the program voltage Vpgm may be increased from a default value. FIG. 14A shows an example in which the level of the program voltage Vpgm is increased 50 mV or 100 mV from the default value. As the level of the program voltage Vpgm is increased, the amount of shift upward or to the right of the threshold voltage distribution of memory cells by a program operation may be increased. In addition, as the secure erase count value of a block to undergo a secure erase operation increases, the program time (or a program loop count) may be increased. As the program time or the program loop count is increased, the amount of shift upward or to the right of the threshold voltage distribution of the memory cells by the program operation may be increased.

FIG. 14B shows the case where a reprogram operation is further performed on a dummy word line when an adaptive secure erase operation is performed.

For example, when the secure erase count value of the first block is K and an adaptive secure erase operation is performed on the first block, a reprogram operation may be performed on memory cells connected to a dummy word line of the first block. Because the threshold voltage distribution of the memory cells connected to the dummy word line has been greatly shifted to the lower range, a reprogram operation may be performed on the memory cells connected to the dummy word line such that the threshold voltage distribution of the memory cells connected to the dummy word line is the same as or similar to that obtained when no secure erase operation has been performed on the first block or when the secure erase count value is 0. In other words, in some example embodiments, an adaptive secure erase operation may further include a reprogram operation on a dummy word line in addition to an erase operation and a one-shot program operation on normal word lines.

Although FIGS. 14A and 14B show the numerical values in one case, the present disclosure is not limited thereto. An adaptive secure erase operation may be performed based on other various methods and numerical values. FIGS. 14A and 14B show examples of operating conditions such as the levels of the erase voltage Vers and the program voltage Vpgm, but the present disclosure is not limited thereto. An adaptive secure erase operation may be performed by adjusting other various factors such as the level of a verify voltage, according to some example embodiments.

Figure 15:
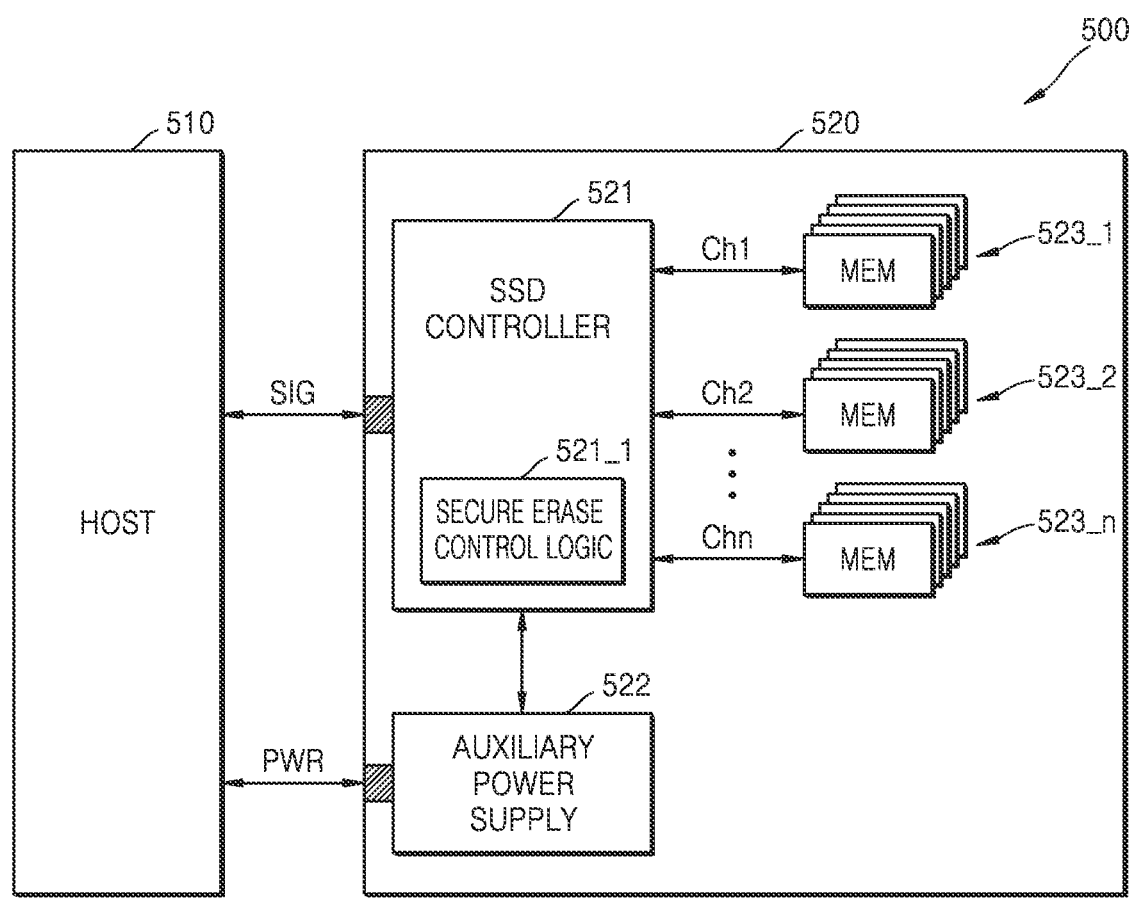
FIG. 15 is a block diagram of an example of applying a storage device to a solid state drive (SSD) system, according to some embodiments.

FIG. 15 is a block diagram of an example of applying a storage device to a solid state drive (SSD) system, according to some embodiments.

Referring to FIG. 15, an SSD system 500 may include a host 510 and an SSD 520. The SSD 520 may exchange signals SIG with the host 510 through a signal connector and may receive power PWR through a power connector. The SSD 520 may include an SSD controller 521, an auxiliary power supply 522, and NVM devices 523_1 to 523_n. The NVM devices 523_1 to 523_n may include NAND flash memory. The SSD 520 may be implemented using the example embodiments described above with reference to FIGS. 1 to 14B. In other words, the SSD controller 521 of the SSD 520 may include a secure erase control logic 521_1, according to the example embodiments described above. The secure erase control logic 521_1 may control a secure erase operation on the NVM devices 523_1 to 523_n in response to a secure erase request from the host 510. According to the example embodiments described above, the secure erase control logic 521_1 may perform a control operation based on the threshold voltage distribution, flag, count value, and the like of each of the blocks of the NVM devices 523_1 to 523_n such that a secure erase operation on a block is skipped or an adaptive secure erase operation is performed on a block.

While the inventive concepts of the present disclosure have been particularly shown and described with reference to some example embodiments thereof, it will be understood that various changes in form and details may be made therein without departing from the scope of the following claims.

What is claimed is:

1. A storage device comprising a controller configured to control a non-volatile memory device including a plurality of blocks, the controller comprising a secure erase control logic configured to control a secure erase operation on the plurality of blocks and configured to perform a control operation in response to a secure erase request from a host with respect to a first block among the plurality of blocks, such that the secure erase operation on the first block is skipped based on a result of determining at least one of a secure erase state and/or a deterioration state of the first block, wherein the controller is further configured to determine the deterioration state according to an amount of downward shift of a threshold voltage distribution of memory cells connected to at least one first word line of the first block, and wherein the controller is further configured to change an operating condition of the secure erase operation on the first block when the first block is determined to have a deteriorated state.

2. The storage device of claim 1, wherein the controller is further configured to perform the secure erase operation on the first block when the first block is determined to have valid data stored therein based on a result of determining a threshold voltage distribution of memory cells of the first block.

3. The storage device of claim 2, wherein the controller is further configured to skip the secure erase operation on the first block when the first block is determined to be in the secure erase state based on the result of determining the threshold voltage distribution of the memory cells of the first block.

4. The storage device of claim 1, wherein the first block includes at least one dummy word line and a plurality of word lines, and
wherein the at least one first word line includes the at least one dummy word line.

5. The storage device of claim 1, wherein the secure erase operation includes an erase operation on memory cells of the first block and a program operation configured to program the memory cells of the first block to a certain threshold voltage state after the erase operation, and
wherein the controller is further configured to decrease a level of an erase voltage during the erase operation or increase a level of a program voltage during the program operation when the deterioration state of the first block increases.

6. The storage device of claim 1, wherein the controller further includes a flag storing circuit storing flags respectively indicating secure erase states of the plurality of blocks,
wherein a flag corresponding to a block that has undergone the secure erase operation among the plurality of blocks has a first value, and a flag corresponding to a block that has undergone no secure erase operation among the plurality of blocks has a second value, and
wherein the secure erase control logic is further configured to determine the secure erase state of the first block based on a result of determining a flag of the first block.

7. An operating method of a storage device including a controller and a non-volatile memory device including a plurality of blocks, the operating method comprising:
receiving a secure erase request from a host with respect to a first block among the plurality of blocks;
determining a secure erase state of the first block based on a threshold voltage distribution of memory cells connected to at least one word line of the first block; and
selectively performing a secure erase operation on the first block under a normal operating condition in response to the secure erase request, wherein the performing of the secure erase operation is based on a determination result indicating that no secure erase operation has been performed on the first block,
wherein the secure erase operation on the first block is skipped in response to the secure erase request when the first block is in the secure erase state.

8. The operating method of claim 7, wherein the threshold voltage distribution of the memory cells has one distribution in the secure erase state, and
the determining of the secure erase state of the first block includes counting off-cells or on-cells among the memory cells based on a certain read level and comparing a count value with a reference value.

9. The operating method of claim 7, further comprising:
receiving a secure erase request from the host with respect to a second block among the plurality of blocks;
determining a deterioration state of the second block according to an amount of downward shift of a threshold voltage distribution of memory cells connected to at least one word line of the second block; and performing the secure erase operation on the second block under an operating condition that is different from the normal operating condition, according to a result of determining the deterioration state.

10. The operating method of claim 9, wherein the second block includes at least one dummy word line and a plurality of word lines, and wherein the at least one word line of the second block includes the at least one dummy word line.

11. The operating method of claim 10, wherein the determining of the deterioration state of the second block includes counting a number of off-cells, among the memory cells connected to the at least one word line of the second block, based on a read level.

12. The operating method of claim 9, wherein the secure erase operation on the second block includes an erase operation on memory cells of the second block and a program operation for programming the memory cells of the second block to a certain threshold voltage state after the erase operation; and wherein a level of an erase voltage is decreased during the erase operation, or a level of a program voltage is increased during the program operation, compared to the normal operating condition, when the deterioration state of the second block increases.

13. The operating method of claim 12, wherein, when the deterioration state of the second block increases, an erase loop count is decreased during the erase operation, or a program loop count is increased during the program operation.

14. An operating method of a storage device including a controller and a non-volatile memory device including a plurality of blocks, the operating method comprising:

receiving a secure erase request from a host;

counting a number of secure erase operations performed on each of the plurality of blocks when a secure erase operation is performed on at least one of the plurality of blocks in response to the secure erase request;

receiving a secure erase request from the host with respect to a first block among the plurality of blocks; and selectively performing the secure erase operation on the first block or skipping the secure erase operation on the first block, wherein the performing or the skipping is selected according to a count value corresponding to the first block.

15. The operating method of claim 14, wherein the secure erase operation is performed on the first block under a normal operating condition when the count value corresponding to the first block indicates that the first block has valid data stored therein.

16. The operating method of claim 15, wherein the secure erase operation on the first block is skipped when the count value corresponding to the first block is less than or equal to N, where N is an integer of at least 1; and wherein the secure erase operation is performed on the first block under an operating condition that is different from the normal operating condition when the count value corresponding to the first block exceeds N.

17. The operating method of claim 16, wherein the secure erase operation includes an erase operation on memory cells of the first block and a program operation that programs the memory cells of the first block to a certain threshold voltage state after the erase operation; and wherein a level of an erase voltage is decreased during the erase operation, or a level of a program voltage is increased during the program operation, compared to the normal operating condition, when the count value corresponding to the first block exceeds N.

18. The operating method of claim 17, wherein the secure erase request from the host includes a value of a secure erase settings (SES) field defined in a non-volatile memory express (NVMe) interface.

* * * * *